US006423173B1

(12) United States Patent
Wexler

(10) Patent No.: US 6,423,173 B1
(45) **Date of Patent: *Jul. 23, 2002**

(54) PROCESS FOR MAKING AN INK JET IMAGE DISPLAY

(75) Inventor: Allan Wexler, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,581

(22) Filed: Jan. 13, 2000

(51) Int. Cl.[7] ............................ B32B 31/20; B41J 2/01

(52) U.S. Cl. ................ 156/277; 156/308.2; 156/331.7; 346/135.1; 347/105

(58) Field of Search ............................ 156/277, 308.2, 156/331.7; 428/195, 327, 332, 339, 343, 347, 349, 355 N; 346/135.1; 347/105

(56) References Cited

U.S. PATENT DOCUMENTS

| | | | | |
|---|---|---|---|---|
| 4,460,637 | A | * | 7/1984 | Miyamoto et al. |
| 4,785,313 | A | | 11/1988 | Higuma et al. |
| 4,832,984 | A | * | 5/1989 | Hasegawa et al. |
| 4,954,395 | A | * | 9/1990 | Hasegawa et al. |
| 5,027,131 | A | * | 6/1991 | Hasegawa et al. |
| 5,059,983 | A | * | 10/1991 | Higuma et al. |
| 5,474,843 | A | * | 12/1995 | Lambert et al. |
| 5,560,982 | A | * | 10/1996 | Sato |
| 5,567,507 | A | * | 10/1996 | Paff et al. |
| 5,695,588 | A | * | 12/1997 | Daems et al. |
| 5,795,425 | A | | 8/1998 | Brault et al. |
| 6,086,700 | A | * | 7/2000 | Valentini et al. |
| 6,114,020 | A | * | 9/2000 | Misuda et al. |
| 6,197,409 | B1 | * | 3/2001 | Bodager et al. |
| 2001/0009712 | A1 | * | 7/2001 | Totani et al. |

FOREIGN PATENT DOCUMENTS

| | | | |
|---|---|---|---|
| JP | 62-283173 | * | 12/1987 |
| JP | 10-445586 | * | 2/1998 |
| JP | 10-81061 | * | 3/1998 |
| JP | 10-226985 | * | 8/1998 |

* cited by examiner

*Primary Examiner*—Curtis Mayes
(74) *Attorney, Agent, or Firm*—Harold E. Cole

(57) ABSTRACT

A process for making an ink jet image display comprising: providing an ink jet recording element comprising a substantially transparent support having thereon, in the order recited, a base layer comprising a hydrophilic or porous material and a porous, ink-receptive top layer capable of accepting an ink jet image comprising a polymeric adhesive binder and thermally-activated adhesive polymeric particles, the polymer used to make the polymeric particles comprising a polycaprolactone; printing an ink jet image on the recording element; bringing the top layer of the recording element in contact with another substrate to form a composite assemblage; and subjecting the composite assemblage to heat and pressure to adhere the recording element to the substrate to form the ink jet image display.

10 Claims, No Drawings

PROCESS FOR MAKING AN INK JET IMAGE DISPLAY

CROSS REFERENCE TO RELATED APPLICATION

Reference is made to commonly-assigned, copending U.S. patent application Ser. No. 09/482659, filed of even date herewith, of Wexler, entitled "Ink Jet Recording Element," the teachings of which are incorporated herein by reference.

FIELD OF THE INVENTION

This invention relates to a process of making an ink jet image display, more particularly to process of making an ink jet image display using a recording element which contains adhesive particles.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof a base layer for absorbing fluid and an ink-receiving or image-forming layer, and includes those intended for reflection viewing, which have an opaque support, and those intended for viewing by transmitted light, which have a transparent support.

It is often desirable to bond an ink jet image via the front surface, i.e., the ink-receiving surface, onto another substrate to form a final bonded composite. Such imaged and bonded composites find utility in a variety of image display applications. For example, an inkjet image could be printed on a transparent support and mounted onto a rigid opaque substrate to provide a rigid composite for direct viewing through the transparent support. An ink jet image could also be printed onto a light-diffusing opaque polyester support with a transparent polyester film laminated to its surface to provide a composite for a backlit display.

U.S. Pat. No. 5,795,425 discloses an ink jet imaging element wherein an ink jet image is deposited onto an adhesive receptor layer which is coated onto a protective layer and a temporary carrier layer. After imaging, the temporary carrier layer is peeled away. However, there is a problem with this element, however, in that it requires a temporary carrier layer and the adhesive receptor layer is not porous so that it has a longer dry time.

U.S. Pat. No. 4,785,313 discloses a recording element comprising a support having thereon an ink transporting layer and an ink retaining layer. The ink transporting layer may contain non-dyeable particles in a binder which is required to be non-dyeable. However, there is a problem with this element in that the dye image has to go through an ink transporting layer until it reaches the ink retaining layer, thus causing the image to spread which reduces image quality.

It is an object of this invention to provide a process of making an ink jet image display using an ink jet recording element which can be laminated to another support for image display applications and which has superior adhesion.

It is another object of this invention to provide a process of making an ink jet image display using an ink jet recording element which when printed with an ink jet image will have a fast dry time.

SUMMARY OF THE INVENTION

This and other objects are provided by the present invention comprising a process for making an ink jet image display comprising:

A) providing an ink jet recording element comprising a substantially transparent support having thereon, in the order recited, a base layer comprising a hydrophilic or porous material and a porous, ink-receptive top layer capable of accepting an ink jet image comprising a polymeric adhesive binder and thermally-activated adhesive polymeric particles, the particle-to-binder ratio being between about 95:5 and 70:30, and wherein both the binder and the polymer used to make the polymeric particles have:

a) a tensile strength at break of greater than about 1 MPa;

b) an elongation at break of greater than about 10%;

c) a tensile modulus of greater than about 1 MPa; and d) a Tg of less than about 50° C.;

and the polymeric particles also having a particle size of less than about 10 $\mu$m and a Tm or softening point of greater than about 50° C.;

B) printing an ink jet image on the recording element;

C) bringing the top layer of the recording element in contact with another substrate to form a composite assemblage; and D) subjecting the composite assemblage to heat and pressure to adhere the recording element to the substrate to form the ink jet image display.

DETAILED DESCRIPTION OF THE INVENTION

In a preferred embodiment of the invention, both the polymeric binder and the polymer used to make the adhesive polymeric particles used in the recording element for the process of the invention have:

a) a tensile strength at break of between about 1 MPa and about 70 MPa, preferably between about 2 MPa and about 50 MPa;

b) an elongation at break between about 10% and about 2,000%, preferably between about 100% and about 1,000%;

c) a tensile modulus of between about 1 MPa and about 500 MPa, preferably between about 2 MPa and about 400 MPa; and d) a Tg of less than about 50° C., preferably from about −60° C. to about 20° C.

In order for the ink-receptive top layer to be sufficiently porous, the particle-to-binder ratio should preferably be between about 95:5 and 70:30, preferably between about 90:10 and 80:20. If the particle-to-binder ratio is above the range stated, the layer will not have any cohesive strength. If the particle-to-binder ratio is below the range stated, the layer will not be porous enough to provide a fast dry time.

The polymer used to make the thermally-activated adhesive, polymeric particles used in the invention may be a partially crystalline or an amorphous polymer, for example, a polycaprolactone such as Tone® (Union Carbide Corp.), an ethylene-vinyl acetate copolymer such as Elvax® (DuPont Corp.), a styrene-ethylene/butylene-styrene block copolymer such as Kraton® (Shell Chemical Corp.), a polyamide such as Griltex CoPolyamide® (EMS American Grilon Corp.), or a polyester such as Griltex CoPolyester® (EMS American Grilon Corp.). Other suitable materials can be found in the *Handbook of Common Polymers* CRC Press 1971, and *Properties of Polymers Elsevier* 1990. In a preferred embodiment, the polymer used to make the polymeric particles comprises a polycaprolactone.

The thermally-activated adhesive, polymeric particles used in the invention may be made using various techniques, such as, for example, evaporative limited coalescence as described in U.S. Pat. No. 4,833,060. Other techniques may also be used such as limited coalescence as described in U.S. Pat. No. 5,354,799, or cryogenic grinding as described in U.S. Pat. No. 4,273,294.

As noted above, the polymer used to make the thermally-activated adhesive polymeric particles has a melting temperature, TM, of greater than about 50° C., or a softening point of greater than about 50° C. The Tm is measured using a differential scanning calorimeter (DSC). In a preferred embodiment, the Tm is between about 60° C. and 120° C. A softening point of a polymer can be measured by the Ring and Ball method as described in ASTM E28.

The polymeric adhesive binder useful in the top layer of the recording element used in the invention may be, for example, a polyurethane such as a Witcobond® Aqueous Urethane Dispersion (Witco Corp.), a vinyl acetate-ethylene copolymer emulsion, an ethylene-vinyl chloride copolymer emulsion, a vinyl acetate-vinyl chloride-ethylene terpolymer emulsion such as Airflex® (Air Products Corp.), an acrylic emulsion such as Flexbond® (Air Products Corp), or polyvinyl alcohol such as Airvol® (Air Products Corp). In a preferred embodiment, the adhesive binder comprises a polyurethane.

The base layer, in general, has a thickness of about 1 $\mu$m to about 20 $\mu$m and the top layer will usually have a thickness of about 2 $\mu$m to about 50 $\mu$m.

The base layer is primarily intended to act as a sponge layer for the absorption of ink solvent. As such, it is primarily composed of hydrophilic or porous materials. Generally, the base layer is present in an amount from about 5 g/m$^2$ to about 7 g/m$^2$, preferably from about 5.3 g/m$^2$ to about 5.5 g/m$^2$. Suitable hydrophilic materials include gelatin, acetylated gelatin, phthalated gelatin, oxidized gelatin, chitosan, poly(alkylene oxide), poly(vinyl alcohol), modified poly(vinyl alcohol), sulfonated polyester, partially hydrolyzed poly(vinylacetate/ vinyl alcohol), poly(acrylic acid), poly(1-vinylpyrrolidone), poly(sodium styrene sulfonate), poly(2-acrylamido-2-methane sulfonic acid), polyacrylamide or mixtures thereof. Copolymers of these polymers with hydrophobic monomers may also be used. Suitable porous materials for a base layer include, for example, silica or alumina in a polymeric binder, including hydrophilic binders such as those described above.

In a preferred embodiment of the invention, the base layer comprises gelatin which may have up to about 15% of another hydrophilic material such as poly(1-vinylpyrrolidone).

As stated above, the support of the recording element used in the invention is substantially transparent. Examples of such supports include various plastics including a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, and various glass materials. The thickness of the support employed in the invention can be, for example, from about 12 to about 500 $\mu$m, preferably from about 75 to about 300 $\mu$m. In a preferred embodiment, the support is a substantially transparent poly(ethylene terephthalate) film.

If desired, in order to improve the adhesion of the base layer to the support, the surface of the support may be corona-discharge-treated prior to applying the base layer or solvent-absorbing layer to the support. Alternatively, an under-coating, such as a layer formed from a halogenated phenol or a partially hydrolyzed vinyl chloride-vinyl acetate copolymer can be applied to the surface of the support.

Since the image recording element may come in contact with other image recording articles or the drive or transport mechanisms of image recording devices, additives such as surfactants, lubricants, matte particles and the like may be added to the element to the extent that they do not degrade the properties of interest. In addition, the top layer of the recording element used in the process of the invention may also contain other additives such as viscosity modifiers or mordants.

The layers described above, including the base layer and the top layer, may be coated by conventional coating means onto a support material commonly used in this art. Coating methods may include, but are not limited to, wound wire rod coating, slot coating, slide hopper coating, gravure, curtain coating and the like. Some of these methods allow for simultaneous coatings of both layers, which is preferred from a manufacturing economic perspective.

As noted above, the composite assemblage is subjected to heat and pressure to adhere the recording element to another substrate to form the ink jet image display. This may be done, for example, by passing the assemblage through a pair of heated rollers at temperatures of, for example, from about 90° C. to about 180° C. at a pressure of from about 0.05 to about 5 MPa.

The other substrate to which the recording element described above may be adhered can be virtually any substrate which is desired to be used, either flexible or rigid, opaque or transparent. In a preferred embodiment, the substrate is rigid and opaque, such as FomeCor® Graphic-Arts Board (International Paper Co.).

Ink jet inks used to image the recording elements employed in the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The following examples further illustrates the invention.

EXAMPLES

Example 1

Adhesion Test

Preparation of Adhesive Polymeric Particles Used In The Invention

Poly(caprolactone), having a molecular weight, $M_n$ of 42,500, a tensile strength of 31 MPa, a tensile modulus of 414 MPa, an elongation at break of 600–800%, a Tg of −60° C. and a Tm of 60° C. (Aldrich Chemical Co.) (125 g) was dissolved in 1.125 kg of ethyl acetate. Separately, an aqueous solution was prepared of 1.875 kg pH4 buffer, 105 g Ludox® TM colloidal silica (DuPont Corp.), and 22.5 g of 10% poly(adipic acid-co-methylaminoethanol). The aqueous solution was placed in a Silverson mixer and the poly(caprolactone) solution was added and emulsified at 3,000 rpm for one minute. The emulsion was then passed through a Microfluidizer (Microfluidics Manufacturing model 110T) to further reduce the emulsion droplet size. After evaporating the ethyl acetate under a nitrogen sweep, a narrowly distributed population of silica-coated poly (caprolactone) particles was obtained having a particle size of about 4.0 μm. The batch was filtered through a coarse screen and after settling sufficient water was decanted to give a dispersion with 30% solids.

Preparation of Control Non-Adhesive Polymeric Particles From a Polymer Not Having An Elongation At Break Of Greater Than 10%

The same procedure was used as above except that the poly(caprolactone) had a $M_n$ of 10,000, a tensile strength of 3 to about 4 MPa, a tensile modulus of 414, a Tg of −60° C., a Tm of 60° C., and an elongation at break of 0.8 to 1.2%. A 30% by weight dispersion was obtained of a narrowly distributed population of silica-coated poly(caprolactone) particles having a particle size of about 2.5–3.0 μm.

The following binders were used to make coating solutions:

A) Polymeric Adhesive Binder Used In The Invention: Witcobond® 320 polyurethane (Witco Corp.) having a tensile strength of 30 MPa, an elongation at break of 700%, a tensile modulus of 7 MPa and a Tg of −12° C. in a 35% solids dispersion.

B) Control Binder From a Polymer Having An Elongation At Break Of Less Than 10% and a Tg of Greater Than 50° C.: gelatin having at 45% RH, an elongation at break of 1–2% and a Tg of 65° C. dissolved in a 10% solution in deionized water.

Solution 1 of the Invention (Adhesive Particles-Binder A)

10.7 g of adhesive polymeric particles, 1.15 g of binder A and 8.15 g of deionized water were mixed together to form a coating solution with a particle-to-binder ratio of 9:1.

Solution 2 of the Invention (Different Ratio of Adhesive Particles-Binder A)

10.7 g of adhesive polymeric particles, 2.3 g of binder A and 7.0 g of deionized water were mixed together to form a coating solution with a particle-to-binder ratio of 8:2.

Control Solution 1 (Adhesive Particles-Control Binder B)

12 g of adhesive polymeric particles, 4 g of the control binder B, and 4.0 g of deionized water were mixed together to form a coating solution with a particle-to-binder ratio of 9:1.

Control Solution 2 (Non-adhesive Particles-Binder A)

10.7 g of non-adhesive polymeric particles, 1.15 g of binder A, and 8.15 g of deionized water were mixed together to form a coating solution with a particle-to-binder ratio of 9:1.

Control Solution 3 (Non-adhesive Particles-Binder B)

12 g non-adhesive polymeric particles, 4 g of the control binder B, and 4 g of deionized water were mixed together to form a coating solution with a particle-to-binder ratio of 9:1.

Coating

A 112 μm thick poly(ethylene terephthalate) transparent support was coated with a base layer comprising 83% gelatin, 15% polyvinyl pyrrolidone, K90 (International Specialty Products Co.) and 2% calcium chloride (by weight, dry thickness of 8.6 g/m$^2$ at 40° C.

Each of the above five solutions were coated over the base layer using a wire wound rod, calibrated to give a wet laydown of 120 μm and air dried to form Elements 1 and 2 of the Invention, and Control Elements 1–3.

Adhesion Test

Each of the elements was cut into 2.5 cm by 20.3 cm strips and placed coated side down onto 7.6 cm×25 cm samples of rigid 0.5 cm thick FomeCor® Graphic-Arts Board (International Paper Co.). The strips were placed along the center of the board with one end taped at the edge (0.3 cm) to fix the position of the element on the board and at the other end of the element a 7.6 cm segment of the coated side was taped over to prevent subsequent adhesion of that coated segment to the board. Thus 12.4 cm was available for bonding to the board and subsequent peel adhesion testing. The composite was then passed through the nip of a Seal Image® 400 laminator at a nominal speed of 0.6 m per minute. The top roller was set to 107° C. and the air pressure to the nip rollers at 0.3 MPa.

A 90-degree peel adhesion test was performed using a MTS Sintech ReNew 4204 Testing System at peel rates of 5 and 30 cm per minute with the board fixed to a movable sled and the maximum peel force was measured. The taped 7.6 cm film segment was raised perpendicular to the board and mechanically coupled to the instrument load cell via a caliper and unarticulated arm. The following results were obtained:

TABLE 1

| | Max. Peel Force (N/cm) | | |
|---|---|---|---|
| Element | 5 cm/min | 30 cm/min | Comments |
| 1 | 1.48 | 1.60 | Substrate cohesive failure |
| 2 | 1.39 | 1.46 | Substrate cohesive failure |
| Control 1 | — | — | No adhesion to board |
| Control 2 | 0.23 | 0.25 | Very poor adhesion to board |
| Control 3 | — | — | No adhesion to board |

The above results show that the elements of the invention provided very good adhesion to the support (substrate delaminated) in comparison to the control elements which adhered very poorly or not at all to the board.

Example 2

Dry Time

Solution 3 of the Invention (Different Ratio of Adhesive Particles/Binder A)

This solution was prepared as Solution 1 of the invention except 10.7 g of adhesive polymeric particles, 3.45 g of binder A and 5.85 g of deionized water were mixed together to form a coating solution with a particle-to-binder ratio of 7:3.

Control Solution 4 (No Particles)

This solution was binder only.

Coating

The above coating solutions were coated as in Example 1 to form Element 3 of the Invention and Control Element 4.

Printing

Elements 1–3 and Control Element 4 were imaged using a Hewlett-Packard 895C Ink Jet printer using HP 51645A ink to give a solid black bar 12 mm×260 mm over a time span of 191 seconds. Thus, when tested immediately after printing, the first area of the bar printed has dried for 191 seconds, while the last area has not dried. Immediately after printing, a blank sheet of bond paper was placed on top of the test pattern, and a 1.75 kg metal cylinder (33 cm long by 4.9 cm diameter) was rolled on the bond paper. The point along the printed bar where there is no more transferred dye is given a time value which is a fractional proportion of the 191 second time span and is taken to be the dry time.

TABLE 2

| Element | Particle:Binder Ratio | Dry Time (sec.) |
|---|---|---|
| 1 | 9:1 | 30 |
| 2 | 8:2 | 48 |
| 3 | 7:3 | 97 |
| Control 4 | 0:100 | >190 |

The above results show that the elements of the invention had a good dry time in comparison to the control element which had no particles and was not porous.

Example 3

Imaged Composite

Solution 4 of the Invention

This solution was prepared as Solution 1 of the invention except that it contained 68 g of adhesive polymeric particles, 6.9 g of binder A, 6.0 g of a 20% solids solution of polyoxazoline water soluble polymer, Aquazol® 500 (Polymer Chemistry Innovations Inc.) and 19.1 g of deionized water were mixed together to form a coating solution with a particle-to-binder ratio of 7:3.

Coating

Solution 4 was coated as in Example 1 to provide Element 4 and imaged as in Example 2.

Adhesion Test

Element 4 was then laminated to a piece of FomeCor® Graphic-Arts Board as in Example 1. The imaged composite element was then tested for adhesion as in Example 1. The element provided very good adhesion to the support (support delaminated). Thus, an imaged composite laminate with good adhesion was produced.

This invention has been described with particular reference to preferred embodiments thereof but it will be understood that modifications can be made within the spirit and scope of the invention.

What is claimed is:

1. A process for making an ink jet image display comprising:

A) providing an inkjet recording element comprising a substantially transparent support having thereon, in the order recited, a base layer comprising a hydrophilic or porous material and a porous, ink-receptive top layer capable of accepting an ink jet image comprising a polymeric adhesive binder and thermally-activated adhesive polymeric particles, the particle-to-binder ratio being between about 95:5 and 70:30, and wherein both said binder and the polymer used to make said polymeric particles have:
   a) a tensile strength at break of greater than about 1 MPa;
   b) an elongation at break of greater than about 10%;
   c) a tensile modulus of greater than about 1 MPa; and
   d) a Tg of less than about 50° C.;

and said polymeric particles also having a particle size of less than about 10 μm, a Tm or softening point of greater than about 50° C., and said polymer used to make said polymeric particles comprises a polycaprolactone;

B) printing an ink jet image on said recording element;

C) bringing said top layer of said recording element in contact with another substrate to form a composite assemblage; and D) subjecting said composite assemblage to heat and pressure to adhere said recording element to said substrate to form said ink jet image display.

2. The process of claim 1 wherein said base layer is gelatin, acetylated gelatin, phthalated gelatin, oxidized gelatin, chitosan, poly(alkylene oxide), poly(vinyl alcohol), modified poly(vinyl alcohol), sulfonated polyester, partially hydrolyzed poly(vinylacetate/vinyl alcohol), poly(acrylic acid), poly(1-vinylpyrrolidone), poly(sodium styrene sulfonate), poly(2-acrylamido-2-methane sulfonic acid), polyacrylamide or mixtures thereof.

3. The process of claim 2 wherein said base layer comprises gelatin.

4. The process of claim 1 wherein said base layer has a thickness of about 1 μm to about 20 μm and said top layer has a thickness of about 2 μm to about 50 μm.

5. The process of claim 1 wherein said support is poly (ethylene terephthalate).

6. The process of claim 1 wherein said binder comprises a polyurethane, a vinyl acetate-ethylene copolymer, an ethylene-vinyl chloride copolymer, a vinyl acetate-vinyl chloride-ethylene terpolymer, an acrylic polymer or a polyvinyl alcohol.

7. The process of claim 1 wherein said binder comprises a polyurethane.

8. The process of claim 1 wherein both said polymeric binder and said polymer used to make said adhesive polymeric particles have:

a) a tensile strength at break of between about 1 MPa and about 70 MPa;

b) an elongation at break between about 10% and about 2,000%;

c) a tensile modulus of between about 1 MPa and about 500 MPa; and d) a Tg of less than about 50° C.

9. The process of claim 1 wherein both said polymeric binder and said polymer used to make said adhesive polymeric particles have:

a) a tensile strength at break of between about 2 MPa and about 50 MPa;

b) an elongation at break between about 100% and about 1,000%;

c) a tensile modulus of between about 2 MPa and about 400 MPa; and d) a Tg of from about −60° C. to about 20° C.

10. The process of claim 1 wherein said substrate is rigid and opaque.

* * * * *